United States Patent
Omori et al.

(10) Patent No.: US 10,297,874 B2
(45) Date of Patent: May 21, 2019

(54) METHOD OF MANUFACTURING ALL-SOLID-STATE BATTERY

(71) Applicant: Toyota Jidosha Kabushiki Kaisha, Toyota-shi, Aichi-ken (JP)

(72) Inventors: Keisuke Omori, Kariya (JP); Hajime Hasegawa, Susono (JP); Kengo Haga, Susono (JP); Mitsutoshi Otaki, Susono (JP); Norihiro Ose, Shizuoka-ken (JP); Daichi Kosaka, Susono (JP); Masato Hozumi, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 296 days.

(21) Appl. No.: 15/264,726

(22) Filed: Sep. 14, 2016

(65) Prior Publication Data

US 2017/0077548 A1 Mar. 16, 2017

(30) Foreign Application Priority Data

Sep. 14, 2015 (JP) ................. 2015-181106

(51) Int. Cl.
  *H01M 10/44* (2006.01)
  *H01M 10/0525* (2010.01)
  *H01M 4/38* (2006.01)
  *H01M 10/0562* (2010.01)
  *H01M 10/0585* (2010.01)

(52) U.S. Cl.
  CPC ......... *H01M 10/446* (2013.01); *H01M 4/386* (2013.01); *H01M 10/0525* (2013.01); *H01M 10/0562* (2013.01); *H01M 10/0585* (2013.01); *Y02W 30/84* (2015.05)

(58) Field of Classification Search
  CPC ........... H01M 10/446; H01M 10/0585; H01M 4/386; H01M 10/0562; H01M 10/0525; Y02W 30/84
  See application file for complete search history.

(56) References Cited

U.S. PATENT DOCUMENTS

| 2007/0015061 A1* | 1/2007 | Klaassen | ................. H01M 4/13 429/322 |
| 2012/0045670 A1* | 2/2012 | Stefan | ................. H01M 4/0421 429/61 |

FOREIGN PATENT DOCUMENTS

| JP | 2009-199761 A | 9/2009 |
| JP | 2010-238484 A | 10/2010 |
| JP | 2011-096470 A | 5/2011 |

(Continued)

OTHER PUBLICATIONS

JP2011096470A (already of record in the application) Machine Translation of Description.*

*Primary Examiner* — Christopher T Schatz
*Assistant Examiner* — Cynthia L Schaller
(74) *Attorney, Agent, or Firm* — Dinsmore & Shohl LLP

(57) ABSTRACT

A method of manufacturing an all-solid-state battery includes a lamination step of laminating a deactivated lithium-containing negative electrode active material layer containing deactivated lithium, a solid electrolyte layer for the all-solid-state battery, and a positive electrode active material layer for the all-solid-state battery such that the solid electrolyte layer for the all-solid-state battery is disposed between the deactivated lithium-containing negative electrode active material layer and the positive electrode active material layer for the all-solid-state battery.

19 Claims, 3 Drawing Sheets

(56) References Cited

FOREIGN PATENT DOCUMENTS

| JP | 2013-182790 A | 9/2013 |
| JP | 2014-216131 A | 11/2014 |
| JP | 2015-008073 A | 1/2015 |
| JP | 2015-032535 A | 2/2015 |
| WO | WO 2013-076565 A1 * | 6/2013 |

* cited by examiner

BEFORE CHARGING

AFTER CHARGING

AFTER DISCHARGING

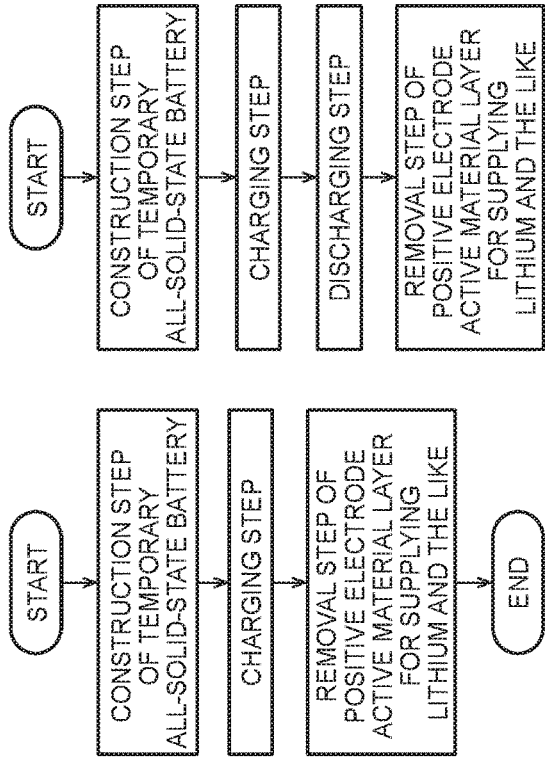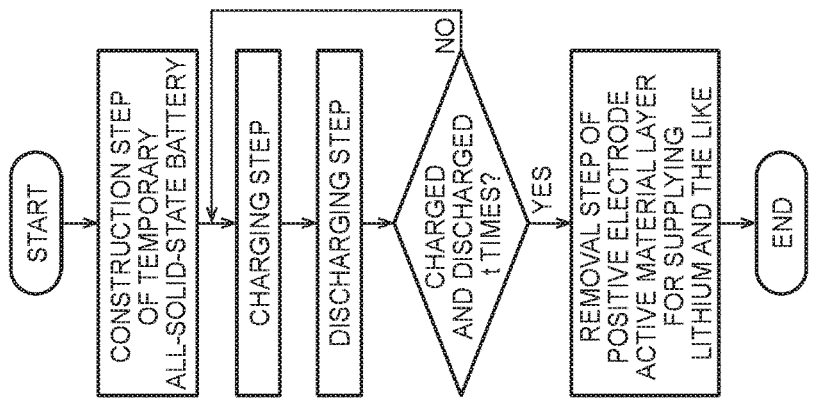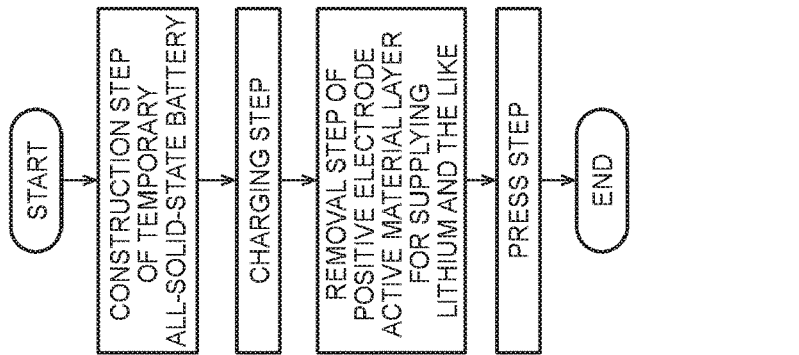

METHOD OF MANUFACTURING ALL-SOLID-STATE BATTERY

INCORPORATION BY REFERENCE

This application claims priority to Japanese Patent Application No. 2015-181106 filed on Sep. 14, 2015, the entire contents of which are hereby incorporated herein by reference into the present application.

BACKGROUND

1. Technical Field

The present disclosure relates to a method of manufacturing an all-solid-state battery.

2. Description of Related Art

Currently, among various batteries, lithium ion batteries have attracted attention from the viewpoint of obtaining high energy density. Among lithium ion batteries, in particular, an all-solid-state battery in which an electrolytic solution is replaced with a solid electrolyte has attracted attention. The reason for this is as follows. Unlike secondary batteries in which an electrolytic solution is used, in the all-solid-state battery, an electrolytic solution is not used. Therefore, for example, the decomposition of an electrolytic solution caused by overcharging does not occur, and cycle durability and energy density are high.

It is known that, in a case where an all-solid-state battery is charged and discharged, the discharge capacity is lower than the charge capacity, that is, irreversible capacity occurs. The reason for this is that, for example, gaps are generated between a negative electrode active material and a solid electrolyte or the like due to expansion and shrinkage of the negative electrode active material caused by charging and discharging.

As a method for solving this problem, Japanese Patent Application Publication No. 2010-238484 (JP 2010-238484 A) discloses a method of reducing the volume of the gaps by pressing the all-solid-state battery again after initial charging.

Examples of a method of manufacturing an all-solid-state battery in the related art include methods disclosed in Japanese Patent Application Publication No. 2015-008073 (JP 2015-008073 A) and Japanese Patent Application Publication No. 2014-216131 (JP 2014-216131 A).

SUMMARY

The present inventors found that irreversible capacity occurs in an all-solid-state battery not only because gaps are generated between a negative electrode active material and a solid electrolyte or the like due to expansion and shrinkage of the negative electrode active material caused by charging and discharging but also because some lithium ions react with a material of a negative electrode active material layer and are deactivated during charging and discharging such that the total amount of lithium ions moving between a positive electrode and a negative electrode in the next charging and discharging is reduced. The present inventors found that irreversible capacity can be reduced by taking measures against the above deactivation of lithium ions.

The present disclosure provides a method of manufacturing an all-solid-state battery in which irreversible capacity is reduced.

According to an aspect of the disclosure, there is provided a method of manufacturing an all-solid-state battery, the method including: a lamination step of laminating a deactivated lithium-containing negative electrode active material layer containing deactivated lithium, a solid electrolyte layer for the all-solid-state battery, and a positive electrode active material layer for the all-solid-state battery such that the solid electrolyte layer for the all-solid-state battery is disposed between the deactivated lithium-containing negative electrode active material layer and the positive electrode active material layer for the all-solid-state battery.

In the lamination step, a first laminate and a second laminate may be laminated such that a first solid electrolyte layer and a second solid electrolyte layer are joined to each other to form the solid electrolyte layer for the all-solid-state battery, the first laminate having a structure in which the deactivated lithium-containing negative electrode active material layer and the first solid electrolyte layer are laminated, and the second laminate having a structure in which the positive electrode active material layer for the all-solid-state battery and the second solid electrolyte layer are laminated.

In the lamination step, the first laminate, a solid electrolyte layer for joining, and the second laminate may be laminated such that the first solid electrolyte layer, the solid electrolyte layer for joining, and the second solid electrolyte layer are joined to each other to form the solid electrolyte layer for the all-solid-state battery, and then the solid electrolyte layer for the all-solid-state battery may be pressed.

The method may further include: a construction step of constructing a temporary all-solid-state battery by laminating a deactivated lithium non-containing negative electrode active material layer, a solid electrolyte layer for supplying lithium, and a positive electrode active material layer for supplying lithium in this order; a charging step of charging the temporary all-solid-state battery to supply lithium to the deactivated lithium non-containing negative electrode active material layer after the construction step such that the deactivated lithium non-containing negative electrode active material layer is converted into the deactivated lithium-containing negative electrode active material layer; and a removal step of removing the positive electrode active material layer for supplying lithium from the temporary all-solid-state battery after the charging step to obtain the first laminate including the solid electrolyte layer for supplying lithium as the first solid electrolyte layer, or a removal step of removing a third laminate including the positive electrode active material layer for supplying lithium and the solid electrolyte layer for supplying lithium from the temporary all-solid-state battery after the charging step to obtain the deactivated lithium-containing negative electrode active material layer.

After the removal step, the removed positive electrode active material layer for supplying lithium or the removed third laminate including the positive electrode active material layer for supplying lithium and the solid electrolyte layer for supplying lithium may be reused in a construction step of constructing another temporary all-solid-state battery.

The method may further include a discharging step of discharging the temporary all-solid-state battery after the charging step.

The charging step and the discharging step may be alternately repeated multiple times.

The removal step may be performed on the temporary all-solid-state battery in a state in which the deactivated lithium-containing negative electrode active material layer further contains non-deactivated lithium.

The deactivated lithium non-containing negative electrode active material layer may contain silicon particles as a negative electrode active material, and the removal step may be performed in a state where a charge amount of the silicon particles in the deactivated lithium-containing negative electrode active material layer is 264 mAh/g or higher and where a lithium storage capacity of the deactivated lithium-containing negative electrode active material layer is higher than a lithium release capacity of the positive electrode active material layer for the all-solid-state battery.

In the charging step, a greater amount of lithium than an amount of lithium, which can be supplied from the positive electrode active material layer for the all-solid-state battery, may be supplied from the positive electrode active material layer for supplying lithium to the deactivated lithium non-containing negative electrode active material layer.

The method may further include a press step of pressing the deactivated lithium-containing negative electrode active material layer or the first laminate after the removal step.

A solid electrolyte of the solid electrolyte layer for the all-solid-state battery may be a sulfide solid electrolyte.

The deactivated lithium-containing negative electrode active material layer may contain a carbon negative electrode active material or a metal negative electrode active material.

The deactivated lithium-containing negative electrode active material layer may contain silicon particles as a negative electrode active material.

According to the disclosure, a method of manufacturing an all-solid-state battery in which irreversible capacity is reduced can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3A is a diagram showing a specific example of steps of a manufacturing method according to one or more embodiments disclosed and described herein;

FIG. 3B is a diagram showing a specific example of steps of a manufacturing method according to one or more embodiments disclosed and described herein;

FIG. 3C is a diagram showing a specific example of steps of a manufacturing method according to one or more embodiments disclosed and described herein; and FIG. 3D is a diagram showing an example of steps of a manufacturing method according to one or more embodiments disclosed and described herein.

DETAILED DESCRIPTION OF EMBODIMENTS

Figure 1A:
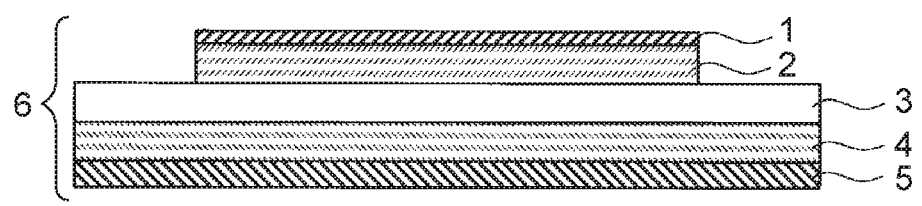
FIG. 1A is a diagram showing an example of an all-solid-state battery which is manufactured using a manufacturing method according to one or more embodiments disclosed and described herein.

Hereinafter, embodiments of the disclosure will be described in detail. The present disclosure is not limited to the following embodiments, and various modifications can be made within the scope of the present disclosure.

In embodiments, a method of manufacturing an all-solid-state battery is provided. The method includes: a lamination step of laminating a deactivated lithium-containing negative electrode active material layer containing deactivated lithium, a solid electrolyte layer for the all-solid-state battery, and a positive electrode active material layer for the all-solid-state battery such that the solid electrolyte layer for the all-solid-state battery is disposed between the deactivated lithium-containing negative electrode active material layer and the positive electrode active material layer for the all-solid-state battery.

Although the present disclosure is not limited to the following principle, it is presumed that the principle of the one or more embodiments disclosed and described herein is as follows.

It is known that the capacity of an all-solid-state battery decreases because a chemical reaction occurs between a solid electrolyte and a current collector or because gaps are generated between positive and negative active materials and a solid electrolyte due to expansion and shrinkage of the positive and negative active materials caused by charging and discharging.

The present inventors found that one of the reasons for a decrease in battery capacity is that, in a case where an all-solid-state battery is charged and discharged, some of the lithium ions released from a positive electrode active material are converted into deactivated lithium by chemically reacting with a material of a negative electrode active material layer.

This mechanism will be described using FIGS. 2A to 2C. Before an all-solid-state battery is charged, a positive electrode active material layer 21 of the all-solid-state battery contains lithium 24 which can be released as lithium ions (refer to FIG. 2A). When the all-solid-state battery is charged, lithium stored in a positive electrode active material is released from the positive electrode active material as lithium ions, pass through a solid electrolyte layer 22, move to a negative electrode active material layer 23, and are stored in the negative electrode active material (refer to FIG. 2B). Conversely, when the all-solid-state battery is discharged, lithium in the negative electrode active material is released from the negative electrode active material as lithium ions, moves to the positive electrode active material layer, and is stored in the positive electrode active material. Here, in a case where the all-solid-state battery is charged, some of the lithium ions stored in the negative electrode active material are converted into deactivated lithium 27 by chemically reacting with a material of the negative electrode active material layer. The deactivated lithium 27 does not move from the negative electrode active material layer to the positive electrode active material layer in the next charging (refer to FIG. 2C). Therefore, as charging and discharging is repeated, the amount of lithium ions moving between the positive electrode active material and the negative electrode active material decreases, and thus the battery capacity decreases. The amount of deactivated lithium produced is the largest during initial charging and decreases as the charging-discharging cycle is repeated.

Figure 2A:
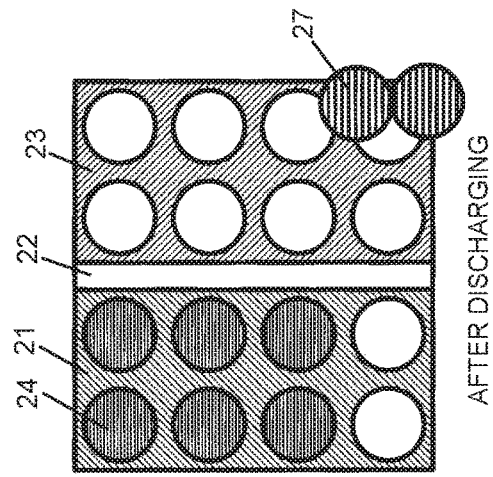
FIG. 2A is a schematic diagram showing an all-solid-state battery for description of a principle of one or more embodiments disclosed and described herein.
Figure 2B:
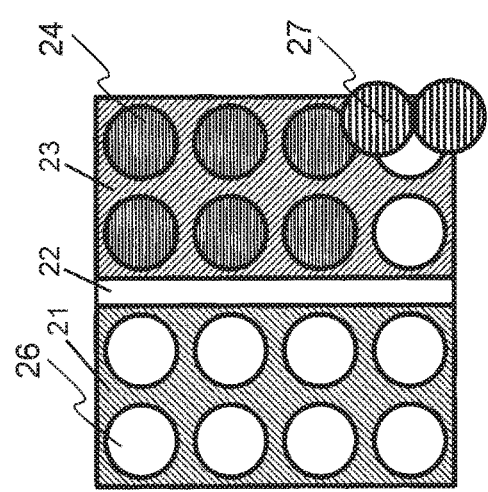
FIG. 2B is a schematic diagram showing an all-solid-state battery for description of a principle of one or more embodiments disclosed and described herein.
Figure 2C:
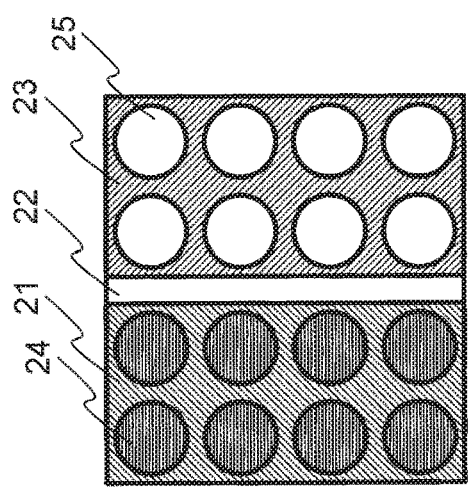
FIG. 2C is a schematic diagram showing an all-solid-state battery for description of a principle of one or more embodiments disclosed and described herein.

FIG. 2A to 2C shows sites 25 of the negative electrode active material where lithium ions can be stored and sites 26 of the positive electrode active material where lithium ions can be stored.

Therefore, an all-solid-state battery in which a decrease in battery capacity is prevented can be manufactured using a method of manufacturing an all-solid-state battery including steps of: completing a temporary all-solid-state battery; charging the temporary all-solid-state battery to produce deactivated lithium in a negative electrode active material; and replacing a positive electrode active material layer with another one to complete an all-solid-state battery.

<Deactivated Lithium-Containing Negative Electrode Active Material Layer>

1. Deactivated Lithium-Containing Negative Electrode Active Material Layer

A deactivated lithium-containing negative electrode active material layer includes a negative electrode active material, deactivated lithium, and a solid electrolyte. The negative electrode active material layer may further include a binder and a conductive additive.

The negative electrode active material is not particularly limited as long as it is a well-known negative electrode active material. Examples of the negative electrode active material include: a carbon negative electrode active material such as graphite, soft carbon, or hard carbon; silicon, a silicon alloy, or a well-known alloy material of tin or the like; and a combination of the above-described examples.

The deactivated lithium described in the disclosure refers to lithium which is produced by lithium ions chemically reacting with the material of the negative electrode active material layer in a case where the all-solid-state battery is charged, and the deactivated lithium does not move between the negative electrode active material and the positive electrode active material The solid electrolyte is not particularly limited as long as it can be used as a solid electrolyte of an all-solid-state battery. Examples of the solid electrolyte include: an amorphous oxide solid electrolyte such as $Li_2O$—$B_2O_3$—$P_2O_5$ or $Li_2O$—$SiO_2$; a sulfide solid electrolyte such as $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, or $Li_2S$—$P_2S_5$; and a crystalline oxide or oxynitride such as $LiI$, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_w$ (w<1), or $Li_{3.6}Si_{0.6}P_{0.4}O_4$.

The binder is not particularly limited, and examples thereof include a polymer resin such as polyvinylidene fluoride (PVDF), polytetrafluoroethylene (PTFE), polyimide (PI), polyamide (PA), polyamide imide (PAI), butadiene rubber (BR), styrene-butadiene rubber (SBR), nitrile-butadiene rubber (NBR), styrene-ethylene-butylene-styrene block copolymer (SEBS), or carboxymethyl cellulose (CMC), and a combination thereof.

Examples of the conductive additive include: a carbon material such as VGCF, acetylene black, Ketjen black, carbon nanotube (CNT), or carbon nanofiber (CNF); a metal such as nickel, aluminum, or SUS; and a combination thereof.

2. Method of Manufacturing Deactivated Lithium-Containing Active Material Layer

The deactivated lithium-containing negative electrode active material layer according to one or more embodiments disclosed and discussed herein can be manufactured by performing the following steps including: a construction step of constructing a temporary all-solid-state battery by laminating a deactivated lithium non-containing negative electrode active material layer, a solid electrolyte layer for supplying lithium, and a positive electrode active material layer for supplying lithium in this order; a charging step of charging the temporary all-solid-state battery to supply lithium to the deactivated lithium non-containing negative electrode active material layer after the construction step such that the deactivated lithium non-containing negative electrode active material layer is converted into the deactivated lithium-containing negative electrode active material layer; and a removal step of removing the positive electrode active material layer for supplying lithium from the temporary all-solid-state battery after the charging step to obtain the first laminate including the solid electrolyte layer for supplying lithium as the first solid electrolyte layer, or a removal step of removing the positive electrode active material layer for supplying lithium and the solid electrolyte layer for supplying lithium from the temporary all-solid-state battery after the charging step to obtain the deactivated lithium-containing negative electrode active material layer.

FIG. 3A shows a specific example of a method of manufacturing the deactivated lithium-containing active material layer. In the manufacturing method shown in FIG. 3A, the construction step of the temporary all-solid-state battery, the charging step of charging the temporary all-solid-state battery, and the removal step of the positive electrode active material layer for supplying lithium and the like are performed in this order.

(1) Deactivated Lithium Non-Containing Negative Electrode Active Material Layer

The deactivated lithium non-containing negative electrode active material layer, which is used in the method of manufacturing the deactivated lithium-containing negative electrode active material layer, includes a negative electrode active material and a solid electrolyte and may further include a binder and a conductive additive. The negative electrode active material, the solid electrolyte, the binder, and the conductive additive are the same as those used in the deactivated lithium-containing negative electrode active material layer.

(2) Solid Electrolyte Layer for Supplying Lithium

In the solid electrolyte layer for supplying lithium, the solid electrolyte examples described above regarding the deactivated lithium-containing negative electrode active material layer can be used. The solid electrolyte layer for supplying lithium can be used as a solid electrolyte layer of the temporary all-solid-state battery. The solid electrolyte layer for supplying lithium may be removed together with the positive electrode active material layer for supplying lithium in the removal step, or may not be removed. In a case where the solid electrolyte layer for supplying lithium is not removed, the solid electrolyte layer for supplying lithium and the deactivated lithium-containing negative electrode active material layer are used in the next lamination step as a first laminate.

(3) Positive Electrode Active Material Layer for Supplying Lithium

The positive electrode active material layer for supplying lithium contains a positive electrode active material and optionally further contains a binder, a conductive additive, and a solid electrolyte.

The positive electrode active material is not particularly limited as long as it is a material which is used as a positive electrode active material for a lithium secondary battery. Examples of the positive electrode active material include lithium cobalt oxide ($LiCoO_2$), lithium nickel oxide ($LiNiO_2$), a lithium nickel manganese cobalt oxide (for example, $Li_{1+x}Ni_{1/3}Co_{1/3}Mn_{1/3}O_2$), lithium manganese oxide ($LiMn_2O_4$), a different element-substituted Li—Mn spinel represented by $Li_{1+x}Mn_{2-x-y}M_yO_4$ (wherein M represents at least one element selected from Al, Mg, Co, Fe, Ni, and Zn), lithium titanate ($Li_xTiO_y$), a lithium metal phosphate having a composition represented by $LiMPO_4$ (M represents one or more elements selected from the group consisting of Fe, Mn, Co, and Ni), and a combination of the above-described examples.

The positive electrode active material may be coated with a protective coating which is a lithium-containing metal oxide containing lithium as a component. As a result, the formation of an oxide film caused by a reaction of the positive electrode active material and the solid electrolyte is prevented, and the deterioration of the positive electrode active material can be prevented. The lithium-containing metal oxide is not particularly limited as long as it is a material which has lithium ion conductivity and can maintain the form of a coating layer so as not to flow even after the contact with the positive electrode active material or the solid electrolyte. For example, lithium niobate ($LiNbO_3$), lithium titanate ($Li_4TiO_{12}$), or lithium phosphate ($Li_3PO_4$) can be used.

As the conductive additive, the binder, and the solid electrolyte, the examples described above regarding the deactivated lithium-containing active material layer can be used.

A lithium content A which can be released from the positive electrode active material layer for supplying lithium may be higher than a lithium content B which can be released from the positive electrode active material layer for an all-solid-state battery used in the all-solid-state battery which is manufactured using the manufacturing method according to the embodiment. More specifically, A/B may be higher than 1, 1.25 or higher, 1.50 or higher, or 1.75 or higher. The upper limit of A/B is not particularly limited. When A/B is excessively high, lithium metal may be deposited in the deactivated lithium-containing negative electrode active material layer during the charging of the temporary all-solid-state battery. However, the deposition of lithium metal can be controlled by controlling charging.

As a result, in the charging step of the temporary all-solid-state battery, a greater amount of lithium than an amount of lithium, which can be supplied from the positive electrode active material layer for the all-solid-state battery, can be supplied from the positive electrode active material layer for supplying lithium to the deactivated lithium non-containing negative electrode active material layer.

(4) Temporary all-Solid-State Battery

The temporary all-solid-state battery includes the deactivated lithium non-containing negative electrode active material layer, the solid electrolyte layer for supplying lithium, and the positive electrode active material layer for supplying lithium. The temporary all-solid-state battery is constructed to convert the deactivated lithium non-containing negative electrode active material layer into the deactivated lithium-containing active material layer by performing the charging step to supply lithium ions to the deactivated lithium non-containing negative electrode active material layer.

(5) Construction Step

In the construction step, the temporary all-solid-state battery is constructed by laminating the deactivated lithium non-containing negative electrode active material layer, the solid electrolyte layer for supplying lithium, and the positive electrode active material layer for supplying lithium in this order.

(6) Charging Step

In the charging step, the temporary all-solid-state battery is charged to supply lithium to the deactivated lithium non-containing negative electrode active material layer. A charging method is not particularly limited, and a well-known method can be used. For example, the temporary all-solid-state battery can be charged by constant current-constant voltage charging. The temporary all-solid-state battery may be discharged after the charging step. Further, charging and discharging may be alternately repeated multiple times.

FIG. 3B shows a specific example of a method of manufacturing the deactivated lithium-containing active material layer, the method including a discharging step of discharging the temporary all-solid-state battery after the charging step. In the manufacturing method shown in FIG. 3B, the construction step of the temporary all-solid-state battery, the charging step of charging the temporary all-solid-state battery, the discharging step, and the removal step of the positive electrode active material layer for supplying lithium and the like are performed in this order.

FIG. 3C shows a specific example of a manufacturing method of manufacturing the deactivated lithium-containing active material layer, in which the charging step of charging the temporary all-solid-state battery and the discharging step of discharging the temporary all-solid-state battery are alternately repeated multiple times. In the manufacturing method shown in FIG. 3C, after performing the construction step of the temporary all-solid-state battery, the charging step and the discharging step are repeated t times, and then the removal step of the positive electrode active material layer for supplying lithium and the like is performed.

It is preferable that the charging step or the discharging step is finished and the removal step is performed in a state where the deactivated lithium-containing negative electrode active material layer further contains non-deactivated lithium without releasing all the lithium ions which are stored in the negative electrode active material. For example, in order to prepare an all-solid-state battery in which the deactivated lithium-containing negative electrode active material layer contains silicon particles as a negative electrode active material, it is preferable that the discharging step is finished such that a charge amount of the silicon particles in the deactivated lithium-containing negative electrode active material layer is 264 mAh/g or higher. As a result, some of the silicon particles used as the negative electrode active material of the all-solid-state battery, which is manufactured using the manufacturing method according to the embodiment, form an alloy with lithium. Thus, during charging, the silicon particles are likely to store lithium ions, and the resistance can be reduced.

The charge amount of the silicon particles in the deactivated lithium-containing negative electrode active material layer may be 300 mAh/g or more, 350 mAh/g or more, 400 mAh/g or more, 450 mAh/g or more, 500 mAh/g or more, 550 mAh/g or more, or 600 mAh/g or more.

In a case where the charging step or the discharging step is finished and the removal step is performed in a state where the deactivated lithium-containing negative electrode active material layer further contains non-deactivated lithium, it is preferable that the charging step is finished such that the lithium storage capacity of the deactivated lithium-containing negative electrode active material layer in the all-solid-state battery is higher than the lithium release capacity of the positive electrode active material layer for the all-solid-state battery after the completion of the all-solid-state battery.

The reason for this is that, in a case where the lithium storage capacity of the deactivated lithium-containing negative electrode active material layer is lower than the lithium release capacity of the positive electrode active material layer for the all-solid-state battery after the completion of the all-solid-state battery, lithium metal may be deposited in the negative electrode active material layer during the charging of the completed all-solid-state battery.

Examples of a method of finishing the charging step or the discharging step in a state where the deactivated lithium-containing negative electrode active material layer further contains non-deactivated lithium include a method of finishing the discharging step at a voltage higher than a minimum value of a charge-discharge control voltage during normal use of the all-solid-state battery which is manufactured using the manufacturing method according to the embodiment. Specifically, in a case where the minimum value of the charge-discharge control voltage of the all-solid-state battery during normal use is 2.5 V, the discharging step may be finished at a voltage of 3.0 V or higher, 3.1 V or higher, 3.2 V or higher, or 3.3 V or higher.

Further, the irreversible capacity of the all-solid-state battery manufactured using the manufacturing method according to one or more embodiments disclosed and discussed herein can be further reduced by supplying a greater amount of lithium than an amount of lithium, which can be supplied from the positive electrode active material layer for the all-solid-state battery, from the positive electrode active material layer for supplying lithium to the deactivated lithium non-containing negative electrode active material layer in the charging step.

Examples of a method of supplying a greater amount of lithium than an amount of lithium, which can be supplied from the positive electrode active material layer for the all-solid-state battery, from the positive electrode active material layer for supplying lithium to the deactivated lithium non-containing negative electrode active material layer include a method of increasing the total amount of lithium ions which can be released from the positive electrode active material layer for supplying lithium to be greater than the total amount of lithium ions which can be released from the positive electrode active material layer for the all-solid-state battery.

The total amount of lithium ions which can be released from the positive electrode active material layer for supplying lithium is not particularly limited as long as it is greater than the total amount of lithium ions which can be released from the positive electrode active material layer for the all-solid-state battery and, for example, may be 1.1 times or more, 1.2 times or more, 1.3 times or more, 1.5 times or more, 1.6 times or more, 1.7 times or more, or 1.8 times or more the amount of lithium ions which can be released from the positive electrode active material layer for the all-solid-state battery.

(7) Removal Step

In the removal step, the positive electrode active material layer for supplying lithium, or the solid electrolyte layer for supplying lithium and the positive electrode active material layer for supplying lithium, which are used to supply lithium to the negative electrode active material, are removed. This step is performed to use the deactivated lithium-containing negative electrode active material layer or the first laminate including the solid electrolyte layer for supplying lithium as a first solid electrolyte layer, to which lithium is supplied in the charging step, in the next step. By performing a press step on the deactivated lithium-containing negative electrode active material layer or the first laminate after the removal step, the shape of the deactivated lithium-containing negative electrode active material layer or the first laminate can be adjusted, and interfacial contact between the deactivated lithium-containing negative electrode active material layer or the first laminate and the solid electrolyte layer or a second laminate can be improved in the next lamination step (refer to FIG. 3D).

<Solid Electrolyte Layer for all-Solid-State Battery>

In the solid electrolyte layer for the all-solid-state battery, the solid electrolyte examples described above regarding the deactivated lithium-containing active material layer can be used.

<Positive Electrode Active Material Layer for all-Solid-State Battery>

The positive electrode active material layer for the all-solid-state battery contains a positive electrode active material and optionally further contains a binder, a conductive additive, and a solid electrolyte. These materials included in the positive electrode active material layer for the all-solid-state battery may be the same as those used in the above-described positive electrode active material layer for supplying lithium.

<Lamination Step>

In the lamination step according to the embodiment, a deactivated lithium-containing negative electrode active material layer 4 containing deactivated lithium, a solid electrolyte layer 3 for an all-solid-state battery, and a positive electrode active material layer 2 for the all-solid-state battery are laminated in this order (refer to FIG. 1A). A laminating method is not particularly limited as long as the deactivated lithium-containing negative electrode active material layer containing deactivated lithium, the solid electrolyte layer for the all-solid-state battery, and the positive electrode active material layer for the all-solid-state battery can be laminated in this order.

Figure 1B:
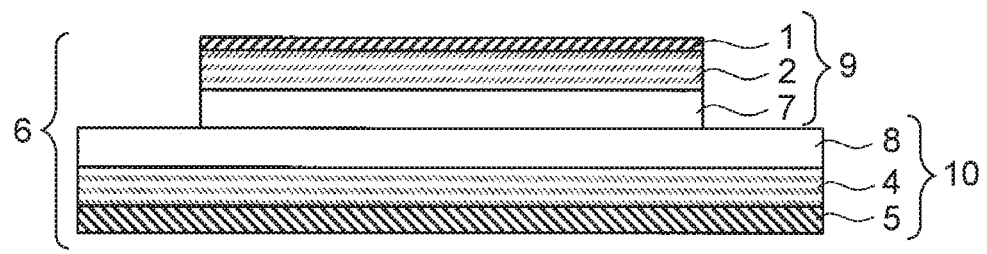
FIG. 1B is a diagram showing an example of an all-solid-state battery which is manufactured using a manufacturing method according to one or more embodiments disclosed and described herein.
Figure 1C:
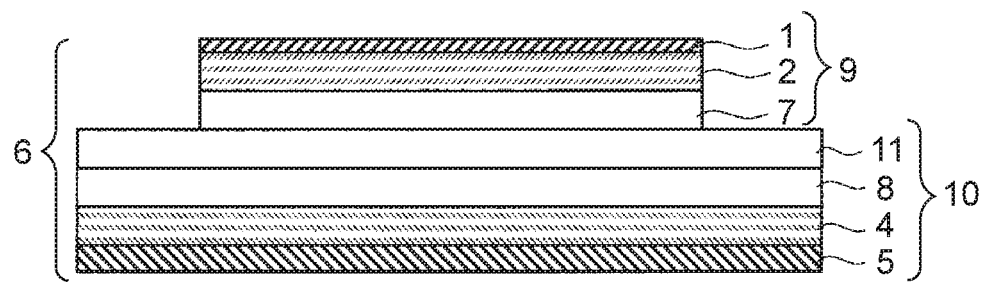
FIG. 1C is a diagram showing an example of an all-solid-state battery which is manufactured using a manufacturing method according to one or more embodiments disclosed and described herein.

For example, in the lamination step, a first laminate 10 and a second laminate 9 can be laminated such that a first solid electrolyte layer 8 and a second solid electrolyte layer 7 are joined to each other to form the solid electrolyte layers 7, 8 for the all-solid-state battery, the first laminate 10 having a structure in which the deactivated lithium-containing negative electrode active material layer 4 and the first solid electrolyte layer 8 are laminated, and the second laminate 9 having a structure in which the positive electrode active material layer 2 for the all-solid-state battery and the second solid electrolyte layer 7 are laminated (refer to FIG. 1B). Further, the first laminate 10, a solid electrolyte layer 11 for joining, and the second laminate 9 can be laminated such that the first solid electrolyte layer 8, the solid electrolyte layer 11 for joining, the second solid electrolyte layer 7 are joined to each other to form the solid electrolyte layers 7, 8, 11 for an all-solid-state battery, and then the solid electrolyte layers 7, 8, 11 for the all-solid-state battery can be pressed after the lamination (refer to FIG. 1C). By interposing the solid electrolyte layer 11 for joining between the first laminate 10 and the second laminate 9, the joining of an interface can be improved, and the internal resistance of the all-solid-state battery can be reduced. FIGS. 1A to 1C show the all-solid-state battery 6 which is manufactured using the manufacturing method according to embodiments disclosed herein and includes a positive electrode current collector 1 and a negative electrode current collector 5 (refer to FIGS. 1A to 1C).

In the solid electrolyte layer for joining, the solid electrolyte examples described above regarding the deactivated lithium-containing negative electrode active material layer can be used. However, in order to improve the interface, it is preferable that an amorphous solid electrolyte which is more flexible than a crystalline solid electrolyte is used.

Example 1 and Comparative Example 1

All-solid-state batteries according to Example 1 and Comparative Example 1 were prepared and were initially charged and discharged, and the initial discharge capacity thereof was measured.

Example 1

1. Method of Preparing Temporary all-Solid-State Battery (1) Preparation of Positive Electrode Active Material Layer for Supplying Lithium A heptane as a dispersion medium, a butyl butyrate solution in which 5 wt % of polyvinylidene fluoride as a binder was dissolved, $LiNi_{1/3}Co_{1/3}Mn_{1/3}O_2$ having an average particle size of 6 μm as a positive electrode active material, and a $Li_2S$—$P_2S_5$ glass ceramic containing lithium iodide having an average particle size of 0.8 μm as a solid electrolyte were put into a polypropylene case, and the components were stirred using an ultrasonic disperser (product name: UH-50, manufactured by SMT Corporation) for 30 seconds. Next, the polypropylene case was shaken using a shaker (product name: TTM-1, manufactured by Sibata Scientific Technology Ltd.) for 3 minutes and was further stirred using an ultrasonic disperser for 30 seconds. As a result, a paste for forming a positive electrode active material layer was prepared.

The paste for forming a positive electrode active material layer was applied to an aluminum foil as a positive electrode current collector using an applicator according to a doctor blade method, and then was dried on a hot plate heated to 100° C. for 30 minutes. As a result, a positive electrode active material layer for supplying lithium was prepared on the positive electrode current collector.

(2) Preparation of Deactivated Lithium Non-Containing Negative Electrode Active Material Layer A heptane as a dispersion medium, a butyl butyrate solution in which 5 wt % of polyvinylidene fluoride as a binder was dissolved, natural graphite-based carbon having an average particle size of 10 μm as a negative electrode active material, a $Li_2S$—$P_5$ glass ceramic containing lithium iodide having an average particle size of 0.8 μm as a solid electrolyte, and a vapor-grown carbon fiber (VGCF) as a conductive additive were put into a polypropylene case, and the components were stirred using an ultrasonic disperser for 30 seconds. Next, the polypropylene case was shaken using a shaker for 30 minutes. As a result, a paste for forming a deactivated lithium non-containing negative electrode active material layer was prepared.

The paste for forming a deactivated lithium non-containing negative electrode active material layer was applied to an copper foil as a negative electrode current collector using an applicator according to a doctor blade method, and then was dried on a hot plate heated to 100° C. for 30 minutes. As a result, a deactivated lithium non-containing negative electrode active material layer was prepared on the negative electrode current collector.

(3) Preparation of Solid Electrolyte Layer

A heptane as a dispersion medium, aa heptane solution in which 5 wt % of butadiene rubber as a binder was dissolved, a $Li_2S$—$P_2S_5$ glass ceramic having an average particle size of 2.5 μm containing lithium iodide as a solid electrolyte were put into a polypropylene case, and the components were stirred using an ultrasonic disperser for 30 seconds. Next, the polypropylene case was shaken using a shaker for 30 minutes. As a result, a paste for a solid electrolyte layer was prepared.

The paste for a solid electrolyte layer was applied to an aluminum foil as a substrate using an applicator according to a doctor blade method, and then was dried on a hot plate heated to 100° C. for 30 minutes. As a result, a solid electrolyte layer was prepared. The positive electrode active material layer for supplying lithium and the deactivated lithium non-containing negative electrode active material layer were arranged on the solid electrolyte layer, and then the laminate was pressed at 6 ton/cm². The aluminum foil on the solid electrolyte layer side layer was removed. As a result, a laminate including the positive electrode active material layer for supplying lithium and the solid electrolyte layer, and a laminate including the deactivated lithium non-containing negative electrode active material layer and the solid electrolyte layer were prepared.

(4) Construction of Temporary all-Solid-State Battery

The laminate including the positive electrode active material layer for supplying lithium and the solid electrolyte layer was punched using a punching tool having a diameter of 12.5 mm, and the laminate including the deactivated lithium non-containing negative electrode active material layer and the solid electrolyte layer was punched using a punching tool having a diameter of 13.0 mm. These two laminates were laminated such that the solid electrolyte layers thereof were joined to each other to form a solid electrolyte layer for supplying lithium, and the solid electrolyte layer for supplying lithium was restrained using a restraining jig at a restraining pressure of 2 N/m. As a result, a temporary all-solid-state battery was prepared.

2. Charging and Discharging of Temporary all-Solid-State Battery

The temporary all-solid-state battery was put into a desiccator and was charged to 4.55 V at 0.05 C by constant current-constant voltage charging (end current: 0.01 C). Next, the battery was discharged to 3 V by constant current-constant voltage discharging. As a result, lithium was supplied to the deactivated lithium non-containing negative electrode active material layer, and thus a deactivated lithium-containing negative electrode active material layer is obtained.

3. Disassembly and Reconstruction of Battery

Next, the restraining of the temporary all-solid-state battery was released, and the temporary all-solid-state battery was disassembled into the laminate including the positive electrode active material layer for supplying lithium and the solid electrolyte layer, and the laminate including the deactivated lithium-containing negative electrode active material layer and the solid electrolyte layer. The laminate including the deactivated lithium-containing negative electrode active material layer and the solid electrolyte layer was set as a first laminate. A new laminate was prepared using the same manufacturing method as that of the laminate including the positive electrode active material layer for supplying lithium and the solid electrolyte layer. This new laminate was punched using a punching tool having a diameter of 12.5 mm and was set as a second laminate. The first laminate and the second laminate were laminated such that the solid electrolyte layers thereof were joined to each other to form the solid electrolyte layers for the all-solid-state battery, and the solid electrolyte layers for the all-solid-state battery were restrained using a restraining jig at a restraining pressure of 2 N/m. As a result, the all-solid-state battery according to Example 1 was prepared.

4. Initial Charging and Discharging

The completed all-solid-state battery was put into a desiccator and was charged to 4.55 V at 0.05 C by constant current-constant voltage charging (end current: 0.01 C). Next, the battery was discharged to 3 V by constant current-constant voltage discharging. At this time, the discharge capacity thereof was measured.

Comparative Example 1

An all-solid-state battery according to Comparative Example 1 was prepared using the same method as the preparation method of the temporary all-solid-state battery in the method according to Example 1. The all-solid-state battery according to Comparative Example 1 was initially charged and discharged using the same method as in Example 1, and then the discharge capacity value thereof was measured.

<Evaluation 1>

Table 1 shows the results of measuring the discharge capacities of the all-solid-state batteries according to Example 1 and Comparative Example 1.

Instead of showing actually measured values, Table 1 shows the discharge capacity of the all-solid-state battery according to Example 1 when the discharge capacity of the all-solid-state battery according to Comparative Example 1 is represented by 100%.

TABLE 1

| | Initial Discharge Capacity (%) |
|---|---|
| Example 1 | 108 |
| Comparative Example 1 | 100 |

As shown in Table 1 it can be seen that the discharge capacity of the all-solid-state battery according to Example 1 was improved by 8% than the discharge capacity of the all-solid-state battery according to Comparative Example 1. It can be said from the above result that the performance of an all-solid-state battery can be improved by replacing a positive electrode active material layer with another one after initial charging as describe in Example 1.

Examples 2 to 5 and Comparative Example B 2

All-solid-state batteries according to Example 2 to 5 and Comparative Example 2 were prepared, and the initial discharge capacity and the internal resistance thereof were measured.

Example 2

An all-solid-state battery according to Example 2 was prepared using the same method as in Example 1, except that: silicon particles having an average particle size of 5 μm were used as the negative electrode active material; vapor-grown carbon fiber (VGCF) as a conductive additive was further added to the paste for forming a negative electrode active material layer; and the temporary all-solid-state battery was discharged to 2.5 V in the charging and discharging steps of the temporary all-solid-state battery. The all-solid-state battery according to Example 2 was initially charged and discharged using the same method as in Example 1, except that the all-solid-state battery was charged to 4.4 V and discharged to 3 V in the initial charging and discharging, and the discharge capacity thereof was measured. The all-solid-state battery was discharged at a constant voltage at a constant rate of 7 C. Based on a voltage drop at this time, the internal resistance of the all-solid-state battery according to Example 2 was calculated.

Example 3

An all-solid-state battery according to Example 3 was prepared using the same method as in Example 2, except that a solid electrolyte layer for joining was inserted between the first laminate and the second laminate. The all-solid-state battery according to Example 3 was initially charged and discharged using the same method as in Example 2, and then the discharge capacity and the internal resistance thereof were measured. A method of preparing the solid electrolyte layer for joining and a laminating method of the first laminate and the second laminate are as follows.

1. Method of Preparing Solid Electrolyte Layer for Joining

A heptane as a dispersion medium, a heptane solution in which 5 wt % of butadiene rubber as a binder was dissolved, and a $Li_2S$—$P_2S_5$ glass having an average particle size of 2.5 μm containing lithium iodide as a solid electrolyte were put into a polypropylene case, and the components were stirred using an ultrasonic disperser for 30 seconds. Next, the polypropylene case was shaken using a shaker for 30 minutes. As a result, a paste for a solid electrolyte layer for joining was prepared.

The paste for a solid electrolyte layer for joining was applied to an aluminum foil as a substrate using an applicator according to a blade method, and then was dried on a hot plate heated to 100° C. for 30 minutes. Next, the dried paste was punched using a punching tool having a diameter of 13.0 mm. As a result, a solid electrolyte layer for joining was prepared on the substrate.

2. Laminating Method of First Laminate and Second Laminate

The solid electrolyte layer for joining on the substrate was laminated on the first laminate such that the solid electrolyte layer of the first laminate was in contact with the solid electrolyte layer for joining, and then the solid electrolyte layers were pressed at 1 ton/cm². Next, the aluminum foil as a substrate was removed. Next, the second laminate was laminated on the solid electrolyte layer for joining such that the solid electrolyte layer of the second laminate and the solid electrolyte layer for joining formed the solid electrolyte layers for the all-solid-state battery, and then the solid electrolyte layers for the all-solid-state battery were pressed at 130° C. at 2 ton/cm².

Examples 4 and 5

All-solid-state batteries according to Examples 4 and 5 were prepared using the same method as in Example 3, except that, in the charging and discharging steps of the temporary all-solid-state battery, the all-solid-state battery according to Example 4 was discharged to 3.1 V and the all-solid-state battery according to Example 5 was discharged to 3.3 V. The all-solid-state battery according to Examples 4 and 5 was initially charged and discharged using the same method as in Example 2, and then the discharge capacity and the internal resistance thereof were measured.

Comparative Example 2

An all-solid-state battery according to Comparative Example 2 was prepared using the same method as the preparation method of the temporary all-solid-state battery in the method according to Example 2. The all-solid-state battery according to Comparative Example 2 was initially charged and discharged using the same method as in Example 2, and then the discharge capacity and the internal resistance thereof were measured.

<Evaluation 2>

Table 2 shows the measurement results of the all-solid-state batteries according to Examples 2 to 5 and Comparative Example 2.

In Table 2, "Negative Electrode Capacity" refers to the charge capacity (mAh/g) of the negative electrode active material per unit weight when the charge capacity of a case where the all-solid-state battery was discharged to 2.5 V is represented by 0. "Negative Electrode Capacity" indicates the total amount of lithium ions which can be released from the negative electrode active material after the charging and discharging steps of the temporary all-solid-state battery. In Table 2, "Resistance" refers to the internal resistance of the all-solid-state battery and is a value calculated based on a voltage drop which was obtained when the all-solid-state battery according to each of Examples and Comparative Examples was discharged at a predetermined voltage at a constant rate of 7 C. In Table 2, "Initial Discharge Capacity" and "Resistance" refer to the resistance values of each of Examples and Comparative Examples when the initial discharge capacity value and the internal resistance value of Comparative Example 2 are represented by 100%.

active material increases, the value of "Resistance" decreases, and the initial discharge capacity increases. The amorphous alloy of lithium and silicon is more reactive with lithium ions rather than silicon, and it is presumed that the amorphous alloy can react with more lithium ions during charging as compared to silicon particles which do not form an amorphous alloy with lithium.

Examples 6 to 8 and Comparative Example 3

All-solid-state batteries according to Example 6 to 8 and Comparative Example 3 were prepared, and the initial discharge capacity, the internal resistance, and the durability thereof were measured.

Example 6

1. Method of Manufacturing Temporary all-Solid-State Battery (1) Preparation of Positive Electrode Active Material Layer for Supplying Lithium A heptane as a dispersion medium, a butyl butyrate solution in which 5 wt % of polyvinylidene fluoride as a binder was dissolved, $LiNi_{1/3}Co_{1/3}Mn_{1/3}O_2$ having an average particle size of 6 μm as a positive electrode active material, a $Li_2S$—$P_2S_5$ glass ceramic containing lithium iodide having an average particle size of 0.8 μm as a solid electrolyte, and a vapor-grown carbon fiber (VGCF) as a

TABLE 2

| | Preparation of Temporary All-Solid-State Battery | Solid Electrolyte Layer for Joining | Discharge End Voltage (V) of Temporary All-Solid-State Battery | Negative Electrode Capacity (mAh/g) | Initial Discharge Capacity (%) | Resistance (%) |
|---|---|---|---|---|---|---|
| Example 2 | Prepared | Not Present | 2.5 | 13 | 109 | 97 |
| Example 3 | Prepared | Present | 2.5 | 12 | 111 | 95 |
| Example 4 | Prepared | Present | 3.1 | 264 | 113 | 83 |
| Example 5 | Prepared | Present | 3.3 | 634 | 116 | 78 |
| Comparative Example 2 | Not Prepared | Not Present | — | — | 100 | 100 |

As shown in Table 2, in the all-solid-state battery according to Example 2, the initial discharge capacity is higher and the value of "Resistance" is lower as compared to the all-solid-state battery according to Comparative Example 2. It can be said from the above result that the performance of an all-solid-state battery can be improved by replacing a positive electrode active material layer with another one after initial charging even when silicon particles are used as a negative electrode active material as described in Example 2.

In addition, in Examples 3 to 5 in which the first laminate and the second laminate were joined to each other using the solid electrolyte layer for joining, the initial discharge capacity was higher and the value of "Resistance" was lower as compared to Example 2 in which the first laminate and the second laminate were not joined to each other using the solid electrolyte layer for joining. The reason for this is that an interface between the first laminate and the second laminate was satisfactorily joined using the solid electrolyte layer for joining.

It can be said from a comparison between Examples 3 to 5 that, as the negative electrode capacity increases, that is, as the amount of lithium which forms an amorphous alloy with silicon in the silicon particles as the negative electrode conductive additive were put into a polypropylene case, and the components were stirred using a ultrasonic disperser (product name: UH-50, manufactured by SMT Corporation) for 30 seconds. Next, the polypropylene case was shaken using a shaker (product name: TTM-1, manufactured by Sibata Scientific Technology Ltd.) for 3 minutes and was further stirred using an ultrasonic disperser for 30 seconds. As a result, a paste for a positive electrode active material layer was prepared.

The paste for a positive electrode active material layer was applied to an aluminum foil as a positive electrode current collector using an applicator according to a blade method, and then was dried on a hot plate heated to 100° C. for 30 minutes. As a result, a positive electrode active material layer for supplying lithium was formed on the positive electrode current collector.

(2) Preparation of Deactivated Lithium Non-Containing Negative Electrode Active Material Layer A heptane as a dispersion medium, a butyl butyrate solution in which 5 wt % of polyvinylidene fluoride as a binder was dissolved, silicon particles having an average particle size of 5 μm as a negative electrode active material, a $Li_2S$—$P_2S_5$ glass ceramic containing lithium iodide having an average particle size of 0.8 μm as a solid electrolyte, and a vapor-grown carbon fiber (VGCF) as a conductive additive were put into a polypropylene case, and the components were stirred using an ultrasonic disperser for 30 seconds. Next, the polypropylene case was shaken using a shaker for 30 minutes. As a result, a paste for a negative electrode active material layer was prepared.

The paste for a negative electrode active material layer was applied to a copper foil as a negative electrode current collector using an applicator according to a blade method, and then was dried on a hot plate heated to 100° C. for 30 minutes. As a result, a deactivated lithium non-containing negative electrode active material layer was formed on the negative electrode current collector.

(3) Preparation of Solid Electrolyte Layer

A heptane as a dispersion medium, a heptane solution in which 5 wt % of butadiene rubber as a binder was dissolved, a $Li_2S$—$P_2S_5$ glass ceramic having an average particle size of 2.5 μm containing lithium iodide as a solid electrolyte were put into a polypropylene case, and the components were stirred using an ultrasonic disperser for 30 seconds. Next, the polypropylene case was shaken using a shaker for 30 minutes. As a result, a paste for a solid electrolyte layer was prepared.

The paste for a solid electrolyte layer was applied to an aluminum foil as a substrate using an applicator according to a doctor blade method, and then was dried on a hot plate heated to 100° C. for 30 minutes. As a result, a solid electrolyte layer was prepared. The positive electrode active material layer for supplying lithium and the deactivated lithium non-containing negative electrode active material layer were arranged on the solid electrolyte layer, and then the laminate was pressed at 6 ton/cm². The aluminum foil on the solid electrolyte layer side layer was removed. As a result, a laminate including the positive electrode active material layer for supplying lithium and the solid electrolyte layer, and a laminate including the deactivated lithium non-containing negative electrode active material layer and the solid electrolyte layer were prepared.

(4) Preparation of Temporary all-Solid-State Battery

The laminate including the positive electrode active material layer for supplying lithium and the solid electrolyte layer was punched using a punching tool having a diameter of 12.5 mm, and the laminate including the deactivated lithium non-containing negative electrode active material layer and the solid electrolyte layer was punched using a punching tool having a diameter of 13.0 mm. These two laminates were laminated such that the solid electrolyte layers thereof were joined to each other to form a solid electrolyte layer for supplying lithium, and the solid electrolyte layer for supplying lithium was restrained using a restraining jig at a restraining pressure of 2 N/m. As a result, a temporary all-solid-state battery was prepared.

2. Charging and Discharging of Temporary all-Solid-State Battery

The temporary all-solid-state battery was put into a desiccator and was charged to 4.55 V at 0.05 C by constant current-constant voltage charging (end current: 0.01 C). Next, the battery was discharged to 2.5 V by constant current-constant voltage discharging. As a result, lithium was supplied to the deactivated lithium non-containing negative electrode active material layer, and thus a deactivated lithium-containing negative electrode active material layer is obtained.

3. Disassembly and Reconstruction of Battery

Next, the restraining of the temporary all-solid-state battery was released, and the temporary all-solid-state battery was disassembled into the laminate including the positive electrode active material layer for supplying lithium and the solid electrolyte layer, and the laminate including the deactivated lithium containing negative electrode active material layer and the solid electrolyte layer. The laminate including the deactivated lithium containing negative electrode active material layer and the solid electrolyte layer was set as a first laminate. A new laminate was prepared using the same method as the above-described method of manufacturing the laminate including the positive electrode active material layer for supplying lithium and the solid electrolyte layer, except that the lithium content in the positive electrode active material layer for supplying lithium which was used in the temporary all-solid-state battery was 1.82 times the lithium content in the positive electrode active material layer for the all-solid-state battery of the newly prepared laminate. This new laminate was punched using a punching tool having a diameter of 12.5 mm and was set as a second laminate.

A solid electrolyte layer for joining, which was prepared using the following method, was laminated on the first laminate such that the solid electrolyte layer of the first laminate was in contact with the solid electrolyte layer for joining, and then was pressed at 1 ton/cm². The aluminum foil as a substrate was removed. Next, the second laminate was laminated such that the solid electrolyte layer of the second laminate and the solid electrolyte layer for joining were joined to each other and such that the solid electrolyte layer of the first laminate, the solid electrolyte layer of the second laminate, and the solid electrolyte layer for joining formed the solid electrolyte layers for the all-solid-state battery, and then the solid electrolyte layers for the all-solid-state battery were pressed at 4.3 ton/cm2. As a result, the all-solid-state battery according to Example 6 was prepared.

4. Preparation of Solid Electrolyte Layer for Joining

A heptane as a dispersion medium, a heptane solution in which 5 wt % of butadiene rubber as a binder was dissolved, a $Li_2S$—$P_2S_5$ glass having an average particle size of 2.5 μm containing lithium iodide as a solid electrolyte were put into a polypropylene case, and the components were stirred using an ultrasonic disperser for 30 seconds. Next, the polypropylene case was shaken using a shaker for 30 minutes. As a result, a paste for a solid electrolyte layer for joining was prepared.

The paste for a solid electrolyte layer for joining was applied to an aluminum foil as a substrate using an applicator, and then was dried on a hot plate heated to 100° C. for 30 minutes. As a result, a solid electrolyte layer for joining was formed on the substrate and was punched using a punching tool having a diameter of 13.0 mm.

5. Initial Charging and Discharging

The completed all-solid-state battery according to Example 6 was put into a desiccator and was charged to 4.55 V at 0.05 C by constant current-constant voltage charging (end current: 0.01 C). Next, the battery was discharged to 2.5 V by constant current-constant voltage discharging. At this time, the discharge capacity thereof was measured. The all-solid-state battery was discharged at a constant voltage at a constant rate of 7 C. Based on a voltage drop at this time, the internal resistance of the all-solid-state battery according to Example 6 was calculated.

6. Measurement of Durability

After the completion of the initial charging and discharging, the all-solid-state battery according to Example 6 was charged to 4.4 V by constant current-constant voltage charging and then was discharged to 2.5 V by constant current-constant voltage discharging. At this time, the discharge capacity was measured (first discharge capacity). Next, the all-solid-state battery was charged to 4.17 V at 0.5 hour rate (2 C) and then was discharged to 3.17 V. This cycle was repeated 300 times. After 300 cycles, the all-solid-state battery according to Example 6 was charged to 4.4 V by constant current-constant voltage charging and then was discharged to 2.5 V by constant current-constant voltage discharging. At this time, the discharge capacity was measured (second discharge capacity). The durability was calculated from "Second Discharge Capacity/First Discharge Capacity".

Examples 7 and 8

All-solid-state batteries according to Examples 7 and 8 were prepared using the same method as in Example 6, except that the lithium contents in positive electrode active material layers for the all-solid-state battery used in the temporary all-solid-state batteries according to Examples 7 and 8 were 1.5 times and 1.01 times the lithium content of the positive electrode active material layer for the all-solid-state battery of the newly prepared laminate, respectively.

The all-solid-state batteries according to Examples 7 and 8 were initially charged and discharged using the same method as in Example 6, and then the discharge capacity values and the internal resistance values thereof were measured. The durability values of the all-solid-state batteries according to Examples 7 and 8 were calculated using the same method as in Example 6.

Comparative Example 3

An all-solid-state battery according to Comparative Example 3 was obtained using the same method as in Example 6, except that the solid electrolyte layer for joining, which was prepared using the same method as in Example 6, was inserted between the laminate including the positive electrode active material layer for the all-solid-state battery and the solid electrolyte layer and the laminate including the negative electrode active material layer and the solid electrolyte layer for the lamination. The all-solid-state battery according to Comparative Example 3 was initially charged and discharged using the same method as in Example 6, and then the discharge capacity and the internal resistance thereof were measured. The durability of the all-solid-state battery according to Comparative Example 3 was calculated using the same method as in Example 6.

<Evaluation 3>

Table 3 shows the measurement results of the all-solid-state batteries according to Examples 6 to 8 and Comparative Example 3.

In Table 3, A/B refers to the ratio of the lithium content (A) which can be released from the positive electrode active material layer for supplying lithium to the lithium content (B) which can be released from the positive electrode active material layer for the all-solid-state battery. In Table 3 "Resistance" refers to the internal resistance of the all-solid-state battery. In Table 3, the values of "Resistance" and "Durability" are the values of Examples 6 to 8 when the values of "Resistance" and "Durability" of Comparative Example 3 are represented by 100%.

TABLE 3

| | Preparation of Temporary All-Solid-State Battery | A/B (—) | Initial Discharge Capacity (mAh/g) | Resistance (%) | Durability (%) |
|---|---|---|---|---|---|
| Example 6 | Prepared | 1.82 | 2671 | 93 | 138 |
| Example 7 | Prepared | 1.50 | 2289 | 94 | 138 |
| Example 8 | Prepared | 1.01 | 2106 | 96 | 132 |
| Comparative Example 3 | Not Prepared | — | 2065 | 100 | 100 |

The resistance of the all-solid-state battery according to Example 8 was 96%, which was lower than the resistance of the all-solid-state battery according to Comparative Example 3. On the other hand, the durability of the all-solid-state battery according to Example 8 was 132%, which was higher than the durability of the all-solid-state battery according to Comparative Example 3.

In the all-solid-state battery according to Example 8, the ratio of the lithium content A, which can be released from the positive electrode active material layer for supplying lithium, to the lithium content B, which can be released from the positive electrode active material layer for the all-solid-state battery, was 1.01, and the resistance and the durability were significantly improved to be higher than those of Comparative Example 3 although there was no significant difference in A/B. This implies that, by replacing the positive electrode active material layer, which deteriorates due to the charging of the all-solid-state battery, with a new positive electrode active material layer, an all-solid-state lithium secondary battery having reduced resistance and improved durability can be manufactured. It can be said from a comparison between Examples 6 to 8 that, as the value of A/B increases, the resistance is reduced, and the durability is improved.

What is claimed is:

1. A method of manufacturing an all-solid-state battery, the method comprising:
   a construction step of constructing a temporary all-solid-state battery by laminating a deactivated lithium non-containing negative electrode active material layer, a solid electrolyte layer for supplying lithium, and a positive electrode active material layer for supplying lithium in this order;
   a charging step of charging the temporary all-solid-state battery to supply lithium to the deactivated lithium non-containing negative electrode active material layer after the construction step such that the deactivated lithium non-containing negative electrode active material layer is converted into the deactivated lithium-containing negative electrode active material layer;
   a removal step of removing the positive electrode active material layer for supplying lithium or the positive electrode active material layer for supplying lithium and the solid electrolyte for supplying lithium from the temporary all-solid-state battery after the charging step to obtain a first laminate including the solid electrolyte layer for supplying lithium and the deactivated lithium-containing negative electrode active material layer or the deactivated lithium-containing negative electrode active material, respectively; and
   a lamination step of laminating the deactivated lithium-containing negative electrode active material layer containing deactivated lithium, a solid electrolyte layer for the all-solid-state battery, and a positive electrode active material layer for the all-solid-state battery such that the solid electrolyte layer for the all-solid-state battery is disposed between the deactivated lithium-containing negative electrode active material layer and the positive electrode active material layer for the all-solid-state battery;

wherein a lithium content which can be released from the positive electrode active material layer for supplying lithium is greater than a lithium content which can be released from the positive electrode active material layer for the all-solid-state battery.

2. The method according to claim 1, wherein
in the lamination step, a first laminate and a second laminate are laminated such that a first solid electrolyte layer and a second solid electrolyte layer are joined to each other to form the solid electrolyte layer for the all-solid-state battery, the first laminate having a structure in which the deactivated lithium-containing negative electrode active material layer and the first solid electrolyte layer are laminated, and the second laminate having a structure in which the positive electrode active material layer for the all-solid-state battery and the second solid electrolyte layer are laminated.

3. The method according to claim 2, wherein
in the lamination step, the first laminate, a solid electrolyte layer for joining, and the second laminate are laminated such that the first solid electrolyte layer, the solid electrolyte layer for joining, and the second solid electrolyte layer are joined to each other to form the solid electrolyte layer for the all-solid-state battery, and then the solid electrolyte layer for the all-solid-state battery is pressed.

4. The method according to claim 1, wherein
after the removal step, the removed positive electrode active material layer for supplying lithium or the removed third laminate including the positive electrode active material layer for supplying lithium and the solid electrolyte layer for supplying lithium is reused in the construction step of constructing another temporary all-solid-state battery.

5. The method according to claim 1, further comprising:
a discharging step of discharging the temporary all-solid-state battery after the charging step.

6. The method according to claim 5, wherein
the charging step and the discharging step are alternately repeated multiple times.

7. The method according to claim 1, wherein
the removal step is performed on the temporary all-solid-state battery in a state in which the deactivated lithium-containing negative electrode active material layer further contains non-deactivated lithium.

8. The method according to claim 7, wherein
the deactivated lithium non-containing negative electrode active material layer contains silicon particles as a negative electrode active material, and
the removal step is performed in a state where a charge amount of the silicon particles in the deactivated lithium-containing negative electrode active material layer is 264 mAh/g or higher and where a lithium storage capacity of the deactivated lithium-containing negative electrode active material layer is higher than a lithium release capacity of the positive electrode active material layer for the all-solid-state battery.

9. The method according to claim 1, wherein
in the charging step, a greater amount of lithium than an amount of lithium, which can be supplied from the positive electrode active material layer for the all-solid-state battery, is supplied from the positive electrode active material layer for supplying lithium to the deactivated lithium non-containing negative electrode active material layer.

10. The method according to claim 1, further comprising:
a press step of pressing the deactivated lithium-containing negative electrode active material layer or the first laminate after the removal step.

11. The method according to claim 1, wherein
a solid electrolyte of the solid electrolyte layer for the all-solid-state battery is a sulfide solid electrolyte.

12. The method according to claim 1, wherein
the deactivated lithium-containing negative electrode active material layer contains a carbon negative electrode active material or a metal negative electrode active material.

13. The method according to claim 1, wherein
the deactivated lithium-containing negative electrode active material layer contains silicon particles as a negative electrode active material.

14. The method according to claim 1, wherein a ratio of a lithium content which can be released from the positive electrode active material layer for supplying lithium to a lithium content which can be released from the positive electrode active material for the all-solid-state battery is greater than 1.25.

15. The method according to claim 1, wherein the positive electrode active material layer comprises a positive electrode active material coated with a lithium-containing metal oxide containing lithium as a component.

16. The method according to claim 2, wherein the solid electrolyte layer for joining comprises an amorphous solid electrolyte.

17. The method according to claim 9, wherein a total amount of lithium ions which can be released from the positive electrode active material layer for supplying lithium is at least 1.1 times an amount of lithium ions which can be released from the positive electrode active material layer for the all-solid-state battery.

18. The method according to claim 5, wherein the charging step or the discharging step is finished at a voltage greater than a minimum value of the charge-discharge control voltage during normal use of the all-solid-state battery.

19. The method according to claim 18, wherein the voltage at which the charging step or the discharging step is finished is at least 0.5V greater than the minimum value of the charge-discharge control voltage during normal use of the all-solid-state battery.

* * * * *

UNITED STATES PATENT AND TRADEMARK OFFICE
CERTIFICATE OF CORRECTION

PATENT NO. : 10,297,874 B2  
APPLICATION NO. : 15/264726  
DATED : May 21, 2019  
INVENTOR(S) : Keisuke Omori et al.

It is certified that error appears in the above-identified patent and that said Letters Patent is hereby corrected as shown below:

In the Specification

In Column 11, Line 44, delete "$Li_2S-P_5$" and insert --$Li_2S-P_2S_5$--, therefor.

In Column 13, Line 45, delete "Example B 2" and insert --Example 2--, therefor.

Signed and Sealed this  
Sixteenth Day of July, 2019

Andrei Iancu  
*Director of the United States Patent and Trademark Office*